(12) United States Patent
Thompson et al.

(10) Patent No.: US 10,618,451 B1
(45) Date of Patent: Apr. 14, 2020

(54) CARGO SECURING DEVICE

(71) Applicants: James R. Thompson, Port Orchard, WA (US); Vinay Oza, Port Orchard, WA (US)

(72) Inventors: James R. Thompson, Port Orchard, WA (US); Vinay Oza, Port Orchard, WA (US)

( * ) Notice: Subject to any disclaimer, the term of this patent is extended or adjusted under 35 U.S.C. 154(b) by 22 days.

(21) Appl. No.: 16/204,627

(22) Filed: Nov. 29, 2018

Related U.S. Application Data

(60) Provisional application No. 62/592,004, filed on Nov. 29, 2017.

(51) Int. Cl.
*B60P 7/08* (2006.01)
*B60P 7/12* (2006.01)

(52) U.S. Cl.
CPC ............... *B60P 7/08* (2013.01); *B60P 7/0823* (2013.01); *B60P 7/12* (2013.01)

(58) Field of Classification Search
CPC .............. B60P 7/08; B60P 7/0823; B60P 7/12
USPC ............. 410/36, 37, 41, 42, 50, 97, 99, 100; 24/68 CD, 197
See application file for complete search history.

(56) References Cited

U.S. PATENT DOCUMENTS

| | | | |
|---|---|---|---|
| 3,377,044 A | 4/1968 | Jackson et al. | |
| 3,807,759 A | 4/1974 | Vornberger | |
| 5,011,349 A * | 4/1991 | McAndrews | A44B 11/25 410/106 |
| 5,423,644 A | 6/1995 | First, Sr. | |
| 5,425,608 A | 6/1995 | Reitnouer | |
| 5,888,039 A | 3/1999 | Cooley | |
| 6,287,062 B1 | 9/2001 | Vallance | |
| 8,764,360 B2 * | 7/2014 | Vick | F16B 2/20 410/97 |
| 2006/0263162 A1 * | 11/2006 | Profit | B25B 25/00 410/100 |

* cited by examiner

*Primary Examiner* — Stephen T Gordon
(74) *Attorney, Agent, or Firm* — Cramer Patent & Design, PLLC; Aaron R. Cramer

(57) ABSTRACT

A cargo securing to secure a plurality of cargo items upon a truck bed includes a pair of hingedly connected plates which work in conjunction with an existing cargo strap to secure a load. During installation, the existing cargo strap is wrapped around the load of cargo, is routed through aperture portions of the device, and the ends of the cargo strap are secured to the truck bed. The aperture portions of the device have edge guards which act to protect the cargo strap from damage.

20 Claims, 3 Drawing Sheets

CARGO SECURING DEVICE

RELATED APPLICATIONS

The present invention is a continuation of and claims the benefit of U.S. Application No. 62/592,004, filed Nov. 29, 2017, the entire disclosures of which are incorporated herein by reference.

FIELD OF THE INVENTION

The present invention relates generally to the field of cargo securing devices.

BACKGROUND OF THE INVENTION

There are countless tractor-trailer trucks that crisscross our country every day. These large vehicles bring just about every object we touch in our daily lives to use. One (1) type of trailer commonly used with large or bulky objects such as PVC pipe, metal pipe, large tubing, logs, and the like is the flatbed trailer. The trailer not only does a great job of transporting such bulky loads but allows access to all three (3) sides of the trailer for loading and unloading purposes.

These trailers often use load straps with a ratcheting mechanism to hold such loads during transit. While these straps are fastened securely during the initial loading process, shifting loads during transit cause the straps to move, causing the loads to shift and even perhaps slicing the straps such that they can no longer be used, or even completely failing. In severe cases, this can result in the load falling from the flatbed trailer. Accordingly, there exists a need for a means by which load straps can be used on flatbed trailer loads prone to load shifting in a manner without the disadvantages as described above. The use of the load strap protecting device allows for restraint of easily shifting flatbed trailer loads in a manner which is quick, easy and effective.

SUMMARY OF THE INVENTION

The principles of the present invention provide for a cargo securing device having a first plate assembly which includes a first plate, a first strap aperture and a link aperture. The first plate assembly is in mechanical communication with an interlocking second plate assembly. There is also a second plate assembly which includes a second plate, a second strap aperture, and a link feature. The first plate and the second plate are attached to each other along respective adjacent edges in a hinged manner via the link aperture and the link feature. The link feature provides a narrowed extending section of the second plate being shaped to enable the link feature to pass through the link aperture to form generally a triangular cross-sectional shape. The first plate and the second plate provide the first strap aperture and the second strap aperture portions which allow for routing of an existing cargo strap through the first plate and the second plate around a plurality of cargo items to secure the cargo items upon a support surface.

Additionally, a pair of edge guards are provided which comprise a first edge guard and a second edge guard along respective the outer edges of the strap apertures. The edge guards are positioned at a point where the existing cargo strap contacts the cargo securing device, thereby preventing damage to the cargo strap. Furthermore, the edge guards comprise a length of small diameter pipe cut and welded over edge portions of the strap apertures, thereby providing a rounded contact surface upon which the existing cargo strap move across without being damaged.

The leading edge of the link feature is affixed to a top surface of the second plate, thereby forming a closed link interior space into which a portion of the first plate, being adjacent to the link aperture, is entrapped. An angle is formed between the first plate assembly and the second plate assembly acts to conform to an upper profile of the cargo to further stabilize and protect the cargo during transit.

The first plate may be made of rectangular steel or a plurality of aluminum sections. The first plate may be six and one-half inches in width, five to eight inches in length and one-quarter inch in thickness. The link aperture may provide a rectangular opening in the first plate being slightly offset from an edge portion adjacent to the second plate.

The link aperture may also provide for an oval-shaped opening in the first plate being slightly offset from an edge portion adjacent to the second plate. The support surface may comprise a truck/trailer bed. The second plate is made of either rectangular steel or a plurality of aluminum sections.

The second plate may be six and one-half inches in width, five to eight inches in length and one-quarter inch in thickness while the pair of edge guards may be made of rectangular steel. The pair of edge guards may be made of a plurality of aluminum sections. The affixing is with a weld.

The cargo securing device may be utilized in conjunction with an existing cargo strap which is intended to wrap around and secure the cargo upon the support surface. A proximal end portion of the existing cargo strap may include a strap hook. The strap hook may be affixed to a corresponding attaching feature of the existing truck/trailer bed during installation.

A distal end of the cargo strap may be extended toward a distal side of the supporting surface and may be secured and cinched tight to an existing attachment feature of the supporting surface using an existing tightening device that includes a strap ratcheting device. A distal end of the cargo strap may be extended toward a distal side of the support surface which is secured and cinched tight to an existing attachment feature of the support surface using an existing tightening device that includes a cam-type strap device. The proximal end portion of the existing cargo strap may include a D-ring.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
| --- | --- |
| 10 | cargo securing device |
| 20 | first plate assembly |

-continued

| DESCRIPTIVE KEY | |
|---|---|
| 22 | first plate |
| 24 | first strap aperture |
| 26 | link aperture |
| 28 | first edge cover |
| 40 | second plate assembly |
| 42 | second plate |
| 44 | second strap aperture |
| 46 | second edge cover |
| 50 | link feature |
| 52 | link interior space |
| 80 | weld |
| 82 | cargo strap |
| 84 | cargo |
| 86 | truck/trailer bed |
| 87 | hook |
| 88 | tightening device |

1. Description of the Invention

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the principles of the present invention. However, only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Figure 1:
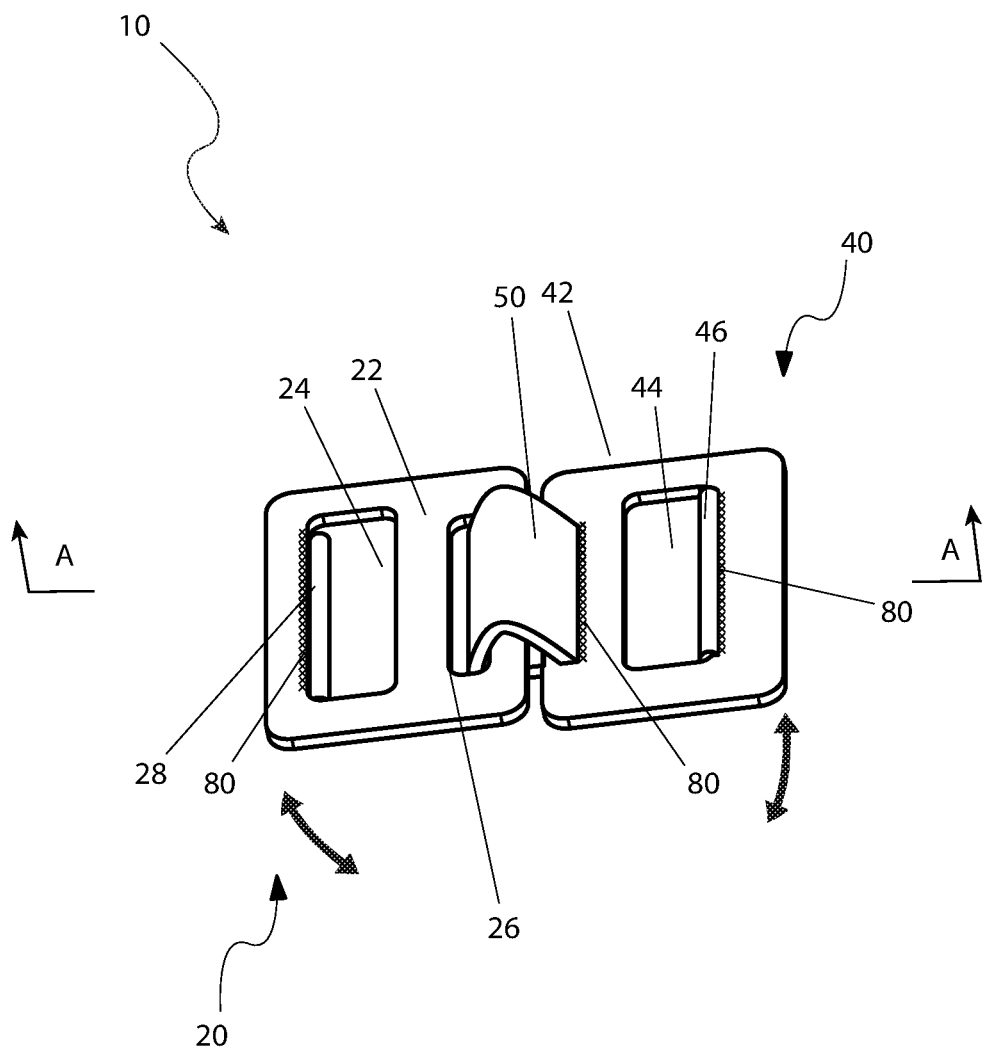
FIG. 1 is a perspective view of a cargo securing device 10, according to a preferred embodiment of the present invention.
Figure 2:
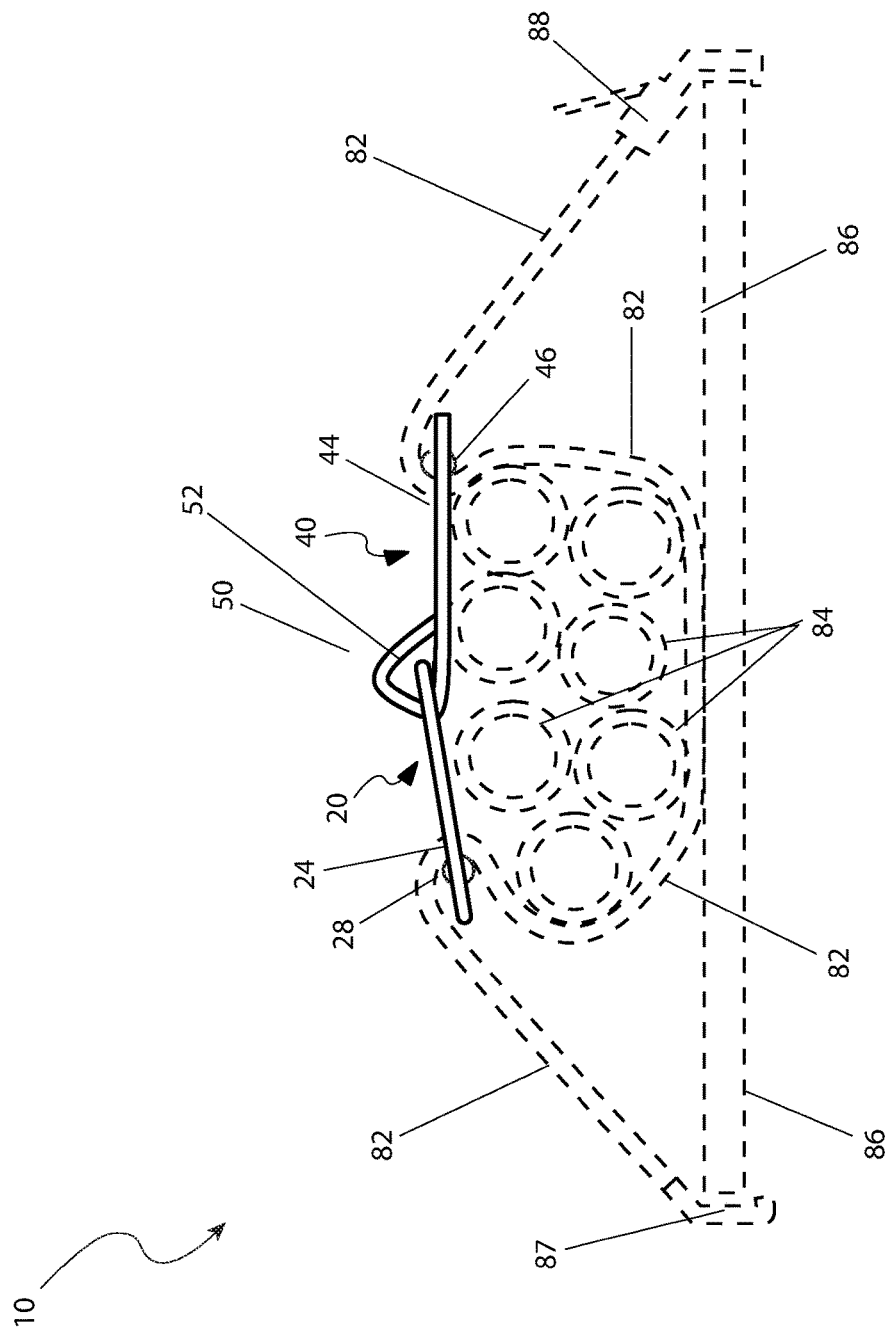
FIG. 2 is an environmental view of the cargo securing device 10 depicting securement of cargo 84, according to a preferred embodiment of the present invention; and, FIG. 3 is a sectional view of the cargo securing device 10 taken along section line A-A (see FIG. 1), according to a preferred embodiment of the present invention.
Figure 3:
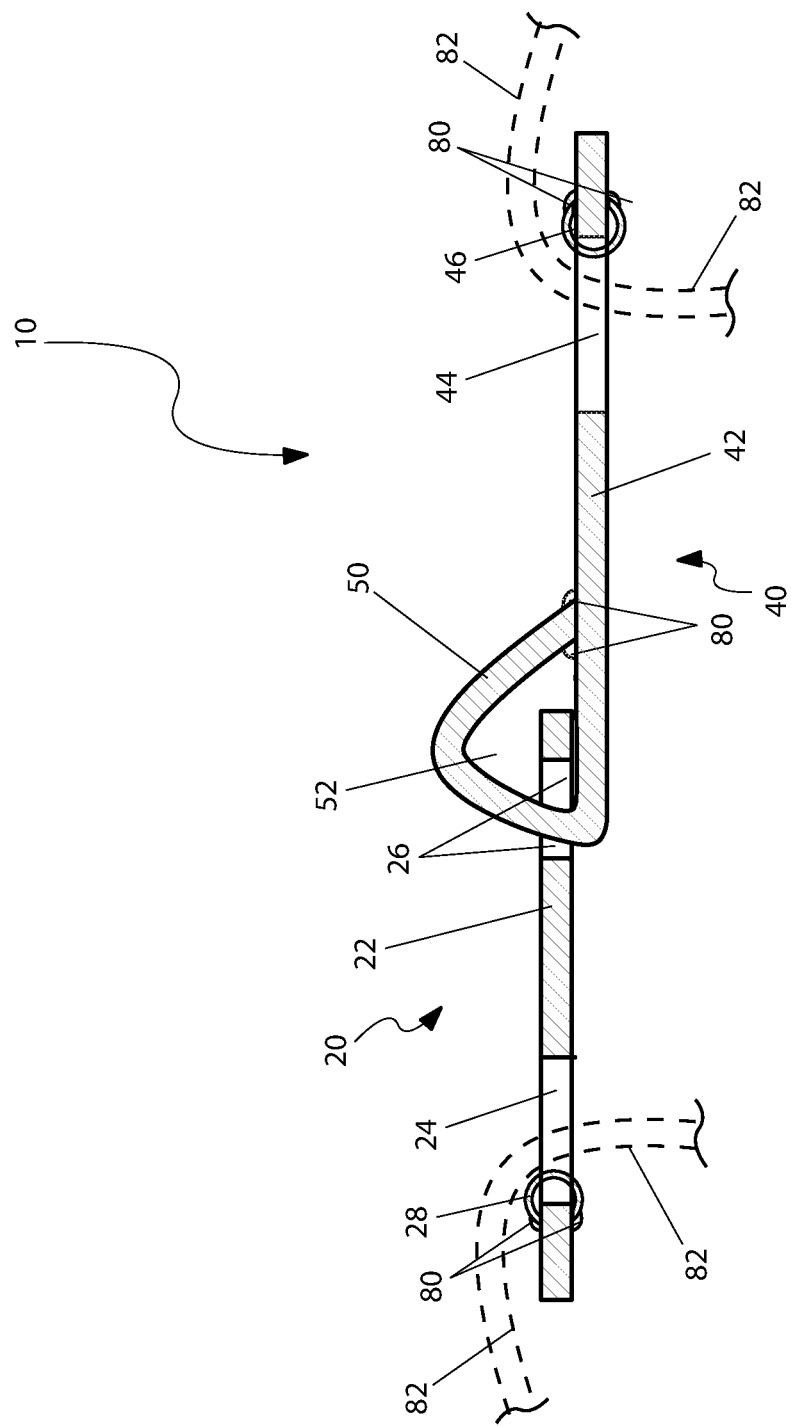

The best mode for carrying out the invention is presented in terms of its preferred embodiment, herein depicted within FIG. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a cargo securing device (herein described as the "device") 10, which provides a means to secure a cargo 84, being especially effective in stabilizing a load of tubular or cylindrical shaped items upon a truck/trailer bed 86, such as pipes, round steel stock, logs, and the like, while also minimizing damage to the cargo 84 during transport.

Referring now to FIG. 1, a perspective view of the device 10, according to the preferred embodiment of the present invention, is disclosed. The device 10 provides a first plate assembly 20 which is in mechanical communication with an interlocking second plate assembly 40. The first plate assembly 20 includes a first plate 22 having a first strap aperture 24 and a link aperture 26. The second plate assembly 40 includes a second plate 42, a second strap aperture 44, and a link feature 50. The first 22 and second 42 plates are to be made using rectangular steel or aluminum sections being approximately six and one-half inches (6-1½ in.) in width, approximately five to eight inches (5-8 in.) in length, and approximately one-quarter inch (¼ in.) in thickness.

The first 22 and second 42 plates are attached to each other along respective adjacent edges in a hinged manner via respective link aperture 26 and a link feature 50 portions. The link aperture 26 provides a rectangular or oval-shaped opening in the first plate 22 being slightly offset from an edge portion adjacent to the second plate 42. The link feature 50 provides a narrowed extending section of the second plate 42, being shaped so as to enable the link feature 50 to pass through the link aperture 26 to form generally a triangular cross-sectional shape. Other shapes are appreciated as falling under the scope of the present invention. The leading edge of the link feature 50 is affixed to a top surface of the second plate 42, thereby forming a closed link interior space 52 into which a portion of the first plate 22, being adjacent to the link aperture 26, is entrapped. Such affixing can be made with a weld 80. The relative pivoting motion of the two (2) plates 22, 42 is indicated by arrows as seen here (also see FIG. 3). It is appreciated that more than two (2) plates 22, 42 can be joined in such a fashion as aforementioned described. Multiple plates 22, 42 can be joined together via link features 50 and link apertures 26 and accomplish the same result.

The plates 22, 42 also provide respective first strap aperture 24 and second strap aperture 44 portions which allow for routing of an existing cargo strap 82 through the plates 22, 42 and around a plurality of cargo items 84 to secure the cargo items 84 upon a support surface, such as a truck/trailer bed 86 (see FIG. 2).

The device 10 provides a pair of edge guards 28, 46 to prevent damage to the cargo strap 82 which could possibly result from repeated use (see FIG. 3).

It is understood that an appropriate number of units of the device 10 would be procured to secure a particular load of cargo 84 based upon the number of cargo items 84, their length, and other associated factors.

Referring now to FIG. 2, an environmental view of the device 10 depicting securement of cargo 84, according to the preferred embodiment of the present invention, is disclosed. The device 10 is to be utilized in conjunction with an existing cargo strap 82. The existing cargo strap 82 is shown here in a preferred arrangement intended to wrap around and secure the cargo 84 upon the truck/trailer bed 86. In an exemplary embodiment as illustrated herein, a proximal end portion of the existing cargo strap 82 includes a strap hook 87; however, a D-ring, or similar attaching device could be used with equal benefit. During installation, the strap hook 87 is affixed to a corresponding attaching feature of an existing truck/trailer bed 86. The distal end portion of the existing cargo strap 82 is then routed through the first strap aperture 24; under and around the cargo 84; and through the second strap aperture 44. The distal end of the cargo strap 82 is then extended toward a distal side of the truck/trailer bed 86, being secured and cinched tight to an existing attachment feature of the existing truck/trailer bed 86 using an existing tightening device 88 such as a strap ratcheting device, a cam-type strap device, or the like. It is further understood that the existing cargo strap 82, being used in combination with the device 10, may be arranged and routed in a number of ways based upon the type and size of the cargo 84, a particular truck/trailer bed 86 configuration, and as such should not be interpreted as a limiting factor of the device 10. As seen here, the angle formed between the first plate assembly 20 and the second plate assembly 40 acts to conform to an upper profile of the cargo 84 to further stabilize and protect the cargo 84 during transit.

Referring now to FIG. 3, a sectional view of the device 10 taken along section line A-A (see FIG. 1), according to a preferred embodiment of the present invention, is disclosed. The plates 22, 42 are attached to each other in a hinged manner via respective link aperture 26 and link feature 50 portions. The link feature 50 is preferably shaped into a closed triangular form (although other shapes can be appreciated as falling under the scope of the present invention) and passes loosely through the link aperture portion 26 of the first plate 22, thereby providing single-axis pivoting motion between the plates 22, 42 (see FIG. 1).

The device 10 provides a first edge guard 28 and a second edge guard 46 along respective outer edges of the strap apertures 24, 44. The edge guards 28, 46 are positioned at a point where the existing cargo strap 82 makes contact with the device 10, thereby preventing damage to the cargo strap 82. The edge guards 28, 46 preferably comprise a length of small diameter pipe being cut and welded 80 over edge portions of the strap apertures 24, 44, thereby providing a rounded contact surface upon which the existing cargo strap 82 may move across without being damaged. Therefore, the edge guards 28, 46 are manufactured out of similar or identical material as the plates 22, 42.

It is envisioned that other styles and configurations of the present invention can be easily incorporated into the teachings of the present invention, and only one (1) particular configuration shall be shown and described for purposes of clarity and disclosure and not by way of limitation of scope.

3. Operation of the Preferred Embodiment

The preferred embodiment of the present invention can be utilized by the common user in a simple and effortless manner with little or no training. After initial purchase or acquisition of the device 10, it would be preferably installed as indicated in FIG. 2.

The method of utilizing the device 10 may be achieved by performing the following steps: procuring a number of units of the device 10 needed to secure a particular load of cargo 84 based upon the number of cargo items 84, their length, and other factors; attaching a strap hook portion 87 of an existing cargo strap 82 to a corresponding attaching feature of an existing truck/trailer bed 86; positioning the device 10 upon a top portion of the load of cargo 84; routing the distal end portion of the existing cargo strap 82 through the first strap aperture portion 24 of the first plate 22; lifting the load of cargo 84 slightly above the existing truck/trailer bed 86 using a fork truck or similar equipment; continuing to route the distal end portion of the existing cargo strap 82 under and around the load of cargo 84; routing the distal end portion of the existing cargo strap 82 through the second strap aperture portion of the second plate 42; extending the distal end of the cargo strap 82 toward a side of the truck/trailer bed 86; lowering the load of cargo 84 onto the existing truck/trailer bed 86; attaching the existing cargo strap 82 to an existing attachment feature of the truck/trailer bed 86; cinching the existing cargo strap 82 tight using an existing tightening device portion 88 of the existing cargo strap 82 such as a strap ratcheting mechanism; repeating the above steps with each remaining device 10 and corresponding cargo strap 82 until the load of cargo 84 is secured; and, benefiting from safe and stable securement of a load of cargo 84 to a truck/trailer bed 86 without damage to the cargo 84 or the strapping 82, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cargo securing device, comprising:
   a first plate assembly including a first plate, a first strap aperture and a link aperture, said first plate assembly is in mechanical communication with an interlocking second plate assembly;
   said second plate assembly including a second plate, a second strap aperture, and a link feature, said first plate and said second plate are attached to each other along respective adjacent edges in a hinged manner via said link aperture and said link feature, said link feature provides a narrowed extending section of said second plate being shaped so as to enable said link feature to pass through said link aperture to form generally a triangular cross-sectional shape, said first plate and said second plate provide said first strap aperture and said second strap aperture to allow for routing of an existing cargo strap through said first plate and said second plate around a plurality of cargo items to secure said cargo items upon a support surface;
   a pair of edge guards including a first edge guard and a second edge guard along respective outer edges of said strap apertures, said edge guards are positioned at a point where existing cargo strap makes contact with said cargo securing device, thereby preventing damage to said cargo strap, said edge guards comprise a length of small diameter pipe cut and welded over edge portions of said strap apertures, thereby providing a rounded contact surface upon which said existing cargo strap move across without being damaged;
   wherein a leading edge of the link feature is affixed to a top surface of said second plate, thereby forming a closed link interior space into which a portion of said first plate, being adjacent to said link aperture, is entrapped; and
   wherein an angle formed between said first plate assembly and said second plate assembly acts to conform to an upper profile of said cargo items to further stabilize and protect said cargo items during transit.

2. The cargo securing device, according to claim 1, wherein said first plate is made of rectangular steel.

3. The cargo securing device, according to claim 1, wherein said first plate is made of a plurality of aluminum sections.

4. The cargo securing device, according to claim 1, wherein said first plate is six and one-half inches in width, five to eight inches in length and one-quarter inch in thickness.

5. The cargo securing device, according to claim 1, wherein said link aperture provides a rectangular opening in said first plate being slightly offset from an edge portion adjacent to said second plate.

6. The cargo securing device, according to claim 1, wherein said link aperture provides an oval-shaped opening in said first plate being slightly offset from an edge portion adjacent to said second plate.

7. The cargo securing device, according to claim 1, wherein said support surface is a truck/trailer bed.

8. The cargo securing device, according to claim 1, wherein said second plate is made of rectangular steel.

9. The cargo securing device, according to claim 1, wherein said second plate is made of a plurality of aluminum sections.

10. The cargo securing device, according to claim 1, wherein said second plate is six and one-half inches in width, five to eight inches in length and one-quarter inch in thickness.

11. The cargo securing device, according to claim 1, wherein said pair of edge guards are made of rectangular steel.

12. The cargo securing device, according to claim 1, wherein said pair of edge guards are made of a plurality of aluminum sections.

13. The cargo securing device, according to claim 1, wherein said affixing is with a weld.

14. The cargo securing device, according to claim 1, wherein said cargo securing device is utilized in conjunction with an existing cargo strap.

15. The cargo securing device, according to claim 14, wherein said existing cargo strap is intended to wrap around and secure said cargo items upon said support surface.

16. The cargo securing device, according to claim 1, further comprising a proximal end portion of said existing cargo strap includes a strap hook.

17. The cargo securing device, according to claim 16, wherein said strap hook is affixed to a corresponding attaching feature of an existing truck/trailer bed during installation.

18. The cargo securing device, according to claim 16, wherein a distal end of said cargo strap is extended toward a distal side of said supporting surface and is secured and cinched tight to an existing attachment feature of said support surface using an existing tightening device that includes a strap ratcheting device.

19. The cargo securing device, according to claim 16, wherein a distal end of said cargo strap is then extended toward a distal side of said support surface is secured and cinched tight to an existing attachment feature of said support surface using an existing tightening device that includes a cam-type strap device.

20. The cargo securing device, according to claim 1, further comprising said proximal end portion of the existing cargo strap includes a D-ring.

* * * * *